(12) United States Patent
Ishikawa et al.

(10) Patent No.: US 7,545,086 B2
(45) Date of Patent: Jun. 9, 2009

(54) DRIVER USING ELECTROMECHANICAL ENERGY TRANSDUCER

(75) Inventors: Jun Ishikawa, Niigata-ken (JP); Yoshinori Fujitani, Niigata-ken (JP); Satoshi Yamada, Niigata-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 435 days.

(21) Appl. No.: 11/198,723

(22) Filed: Aug. 4, 2005

(65) Prior Publication Data

US 2006/0028101 A1 Feb. 9, 2006

(30) Foreign Application Priority Data

Aug. 6, 2004 (JP) ............... 2004-230242

(51) Int. Cl.
*H01L 41/08* (2006.01)
(52) U.S. Cl. .................................... 310/369
(58) Field of Classification Search ... 310/316.1–316.3, 310/328, 369, 316.01–316.03
See application file for complete search history.

(56) References Cited

U.S. PATENT DOCUMENTS

| | | | |
|---|---|---|---|
| 5,000,030 A * | 3/1991 | Umeda et al. ............... 73/1.39 |
| 6,218,764 B1 * | 4/2001 | Yoshida et al. ............. 310/317 |
| 6,384,518 B1 * | 5/2002 | van Poppel ................. 310/369 |
| 2002/0195904 A1 * | 12/2002 | Sumrak et al. ............. 310/346 |
| 2003/0010114 A1 * | 1/2003 | Getman et al. ............ 73/290 R |
| 2006/0244347 A1 * | 11/2006 | Bae et al. .................... 310/369 |
| 2007/0075610 A1 * | 4/2007 | Manabe et al. ............. 310/348 |
| 2007/0257581 A1 * | 11/2007 | Buma ......................... 310/348 |

FOREIGN PATENT DOCUMENTS

| | | | |
|---|---|---|---|
| JP | 63048169 A | * | 2/1988 |
| JP | 01046619 A | * | 2/1989 |
| JP | 07308083 A | * | 11/1995 |
| JP | 09117165 A | * | 5/1997 |
| JP | 11030556 A | * | 2/1999 |
| JP | 11055969 A | * | 2/1999 |
| JP | 2000329842 A | * | 11/2000 |

OTHER PUBLICATIONS

Japanese Unexamined Patent Application Publication No. 7-308083.

* cited by examiner

*Primary Examiner*—Jaydi SanMartin
(74) *Attorney, Agent, or Firm*—Brinks Hofer Gilson & Lione

(57) ABSTRACT

A driver includes an electromechanical energy transducer deformed by applying and removing voltage, a supporting member having the electromechanical energy transducer joined thereto for transmitting movement of the electromechanical energy transducer resulting from the deformation to the supporting member, and a movable body disposed in an inner peripheral portion of the supporting member. A deformation speed of the electromechanical energy transducer when a state change occurs from a prior-to-deformation state of the electromechanical energy transducer to an after-deformation state of the electromechanical energy transducer differs from a deformation speed of the electromechanical energy transducer when state change occurs from the after-deformation state to the prior-to-the deformation state. When the electromechanical energy transducer is deformed at the lower of the deformation speeds, frictional force generated between the movable body and the inner peripheral portion moves the movable body and the supporting member.

19 Claims, 3 Drawing Sheets

DRIVER USING ELECTROMECHANICAL ENERGY TRANSDUCER

BACKGROUND OF THE INVENTION

1. Field of the Invention

The present invention relates to a driver for applying drive power to a movable body by making use of the expansion and contraction of an electromechanical energy transducer, and, more particularly, to a driver which can be reduced in size by using fewer parts and which generates a large drive power.

2. Description of the Related Art

FIGS. 1 to 7 in Japanese Unexamined Patent Application Publication No. 7-308083 (Patent Document 1) illustrates a driver having a structure in which a movable portion 2 is inserted in an inner peripheral surface (guide surface 1a) of a cylindrical guide 1. In the driver, the movable portion 2 is joined to a driving portion 3 for driving the movable portion 2 in an axial direction of the guide 1, and an inertial portion 4 is joined to the driving portion 3. The movable portion 2, the driving portion 3, and the inertial portion 4 are inserted in the guide surface 1a.

A presser member 6 having the form of a tongue piece is formed at the movable portion 2.

The driving portion 3 has a piezoelectric element 7 which expands and contracts in an axial direction of the guide 1 for generating drive power at the movable portion 2. The inertial portion 4 is joined to the piezoelectric element 7.

The inertial portion 4 includes a disc-shaped holding plate 9 and a lens 10 held by and secured to the holding plate 9.

In the driver disclosed in Patent Document 1, a side edge 6e of the presser member 6 contacts the guide surface 1a while the side edge 6e is exhibiting resiliency. Frictional force generated by the contact causes the movable portion 2 and the driving portion 3 to be supported by the guide surface 1a.

In the driver, as illustrated in FIG. 3 in Patent Document 1, when the piezoelectric element 7 is expanded rapidly by rapidly applying a voltage to the piezoelectric element 7, inertial force of the inertial portion 4 overcomes the frictional force between the presser member 6 at the movable portion 2 and the guide surface 1a, so that the movable portion 2 moves in the direction of arrow Ra shown in FIG. 3A in Patent Document 1.

After the movement of the movable portion 2, if the voltage being applied to the piezoelectric element 7 is gradually reduced, the piezoelectric element 7 gradually contracts. Here, the movable portion 2 remains at rest by the frictional force between the guide surface 1a and the presser member 6 at the movable portion 2.

After gradually expanding and contracting the piezoelectric element 7 by gradually applying the voltage to the piezoelectric element 7, if the voltage being applied to the piezoelectric element 7 is rapidly reduced, as shown in FIG. 5 in Patent Document 1, the movable portion 2 can be moved in a direction opposite to that shown in FIG. 3 in Patent Document 1.

A driver making use of the same principle and having a similar structure is illustrated and disclosed in FIGS. 8 to 13 in Patent Document 1.

By repeating the expansion and contraction of the piezoelectric element 7 as described above, the movable portion 2 is moved in an axial direction of the guide 1.

In the driver disclosed in Patent Document 1, the frictional force for supporting the movable portion 2 at the guide surface 1a is produced by the resilient presser member 6. Therefore, in the driver disclosed in Patent Document 1, the presser member 6 is indispensable to properly moving the movable portion 2. Consequently, the number of parts is increased, as a result of which there is a limit as to how small the driver can be made.

In the driver disclosed in Patent Document 1, the piezoelectric element 7 for generating drive power is formed at the driving portion 3 inserted in the guide surface 1a of the guide 1. Here, the guide surface 1a is formed by an inner peripheral surface of the cylindrical guide 1. Therefore, there is a limit as to how large it can be made.

Therefore, parts, such as the presser member 6, must be formed in a small space, thereby making it difficult to manufacture the parts and making it necessary to make the piezoelectric element 7 small. Consequently, there is a limit as to how large the drive power that is generated can be.

SUMMARY OF THE INVENTION

Accordingly, it is an object of the present invention to provide a driver which can be reduced in size by using fewer parts and which generates a large drive power.

To this end, according to the present invention, there is provided a driver comprising an electromechanical energy transducer which is deformed by applying and removing a voltage, a supporting member having an inner peripheral portion, the electromechanical energy transducer being joined to the supporting member for transmitting a movement of the electromechanical energy transducer resulting from the deformation of the electromechanical energy transducer to the supporting member, and a movable body disposed in the inner peripheral portion of the supporting member. When a state of the electromechanical energy transducer before the electromechanical energy transducer is deformed is called a prior-to-deformation state and a state of the electromechanical energy transducer after the electromechanical energy transducer is deformed is called an after-deformation state, a speed of deformation of the electromechanical energy transducer when a change in state occurs from the prior-to-deformation state to the after-deformation state differs from a speed of deformation of the electromechanical energy transducer when a change in state occurs from the after-deformation state to the prior-to-deformation state. When the electromechanical energy transducer is deformed at the lower of the deformation speeds, frictional force generated between the movable body and the inner peripheral portion moves the movable body and the supporting member.

In the driver according to the present invention, static frictional force is generated between the inner peripheral portion of the supporting member and the surface of the movable body by inserting the movable body in the inner peripheral portion of the supporting member.

The electromechanical energy transducer is secured not to the movable body but to the supporting member.

Therefore, it is not necessary to provide a part, such as a resilient presser member, in order to generate static frictional force between the inner peripheral portion of the supporting member and the movable body. Consequently, the driver can be reduced in size.

Since the electromechanical energy transducer is secured to the supporting member, the electromechanical energy transducer can be made large. Therefore, the driver can generate a large drive power.

That is, the driver according to the invention of the application can be made small and can generate a large drive power at the same time, so that two opposite effects can be achieved.

In this case, the electromechanical energy transducer may be deformable in a longitudinal direction of the inner peripheral portion.

In addition, the electromechanical energy transducer may be secured to a securing member.

Accordingly, when the electromechanical energy transducer is secured to the securing member, deformation movement of the electromechanical energy transducer can be properly transmitted to the supporting member.

In the driver according to the present invention, static frictional force is generated between the inner peripheral portion of the supporting member and the surface of the movable body by inserting the movable body in the inner peripheral portion of the supporting member.

The electromechanical energy transducer is secured not to the movable body but to the supporting member.

Therefore, it is not necessary to provide a part, such as a resilient presser member, in order to generate static frictional force between the inner peripheral portion of the supporting member and the movable body. Consequently, the driver can be reduced in size.

Since the electromechanical energy transducer is secured to the supporting member, the electromechanical energy transducer can be made large. Therefore, the driver can generate a large drive power.

That is, the driver according to the invention of the application can be made small and can generate a large drive power at the same time, so that two opposite effects can be achieved.

In the structure in which the rear end surface of the electromechanical energy transducer is secured to the surface of the securing member, deformation movement of the electromechanical energy transducer can be properly transmitted to the supporting member.

BRIEF DESCRIPTION OF THE DRAWINGS

In other words, FIG. 2A shows the drive state of the driver 50 shown in FIG. 1 as viewed from the direction of arrow X1 shown in FIG. 1, FIG. 2B shows the next drive state after the drive state in FIG. 2A as viewed from the direction of arrow X1, and FIG. 2C shows the following drive state after the drive state in FIG. 2B as viewed from the direction of arrow X1;

More specifically, FIG. 3A shows the voltage waveform applied to a beam-limiting unit shown in FIG. 1, FIG. 3B shows the voltage waveform that is applied following the application of the voltage waveform shown in FIG. 3A, and FIG. 3C shows the voltage waveform that is applied following the application of the voltage waveform shown in FIG. 3B.

DESCRIPTION OF THE PREFERRED EMBODIMENT

Figure 1:
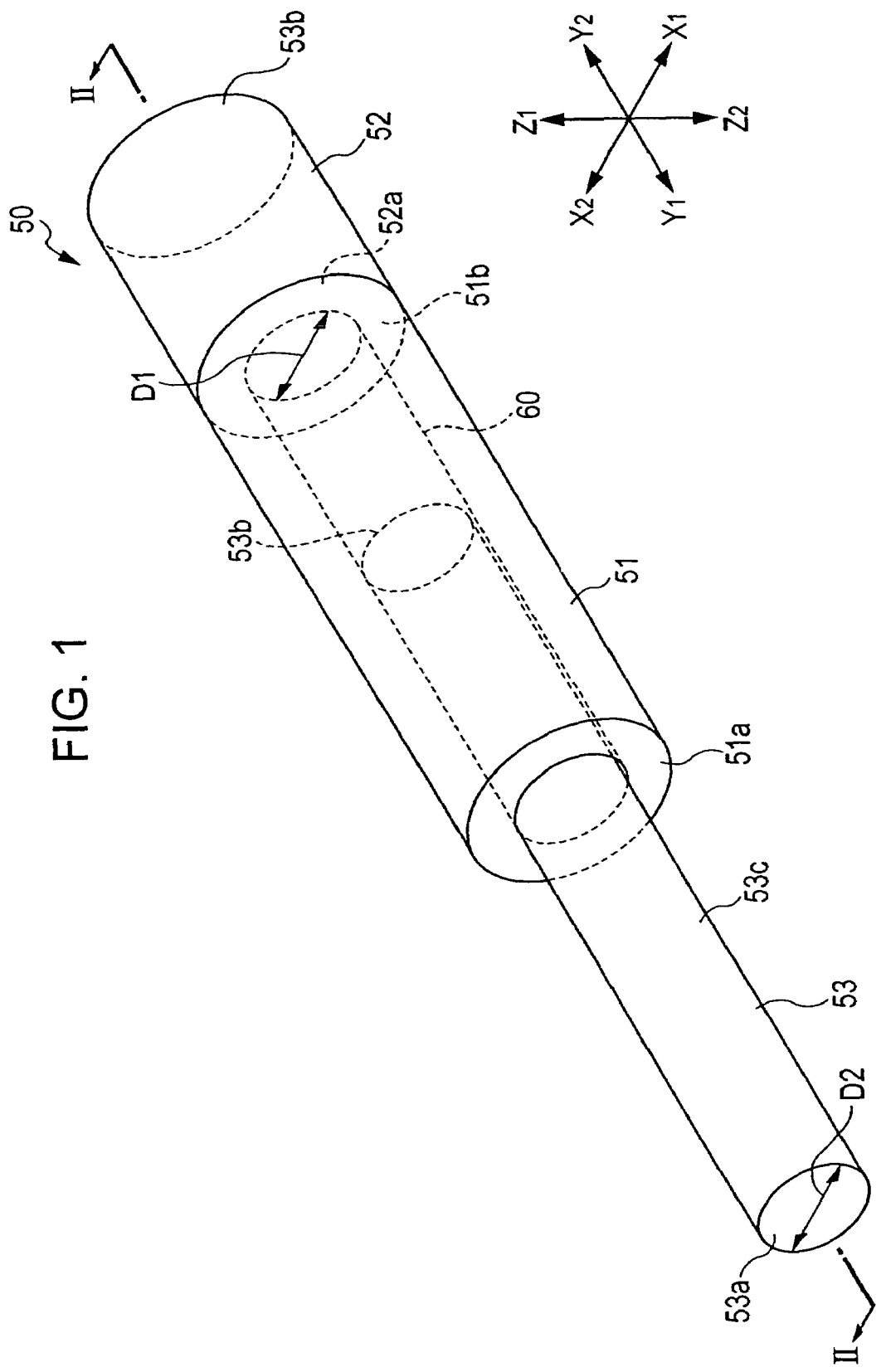
FIG. 1 is a perspective view of a driver 50 according to the present invention.
Figure 2A:
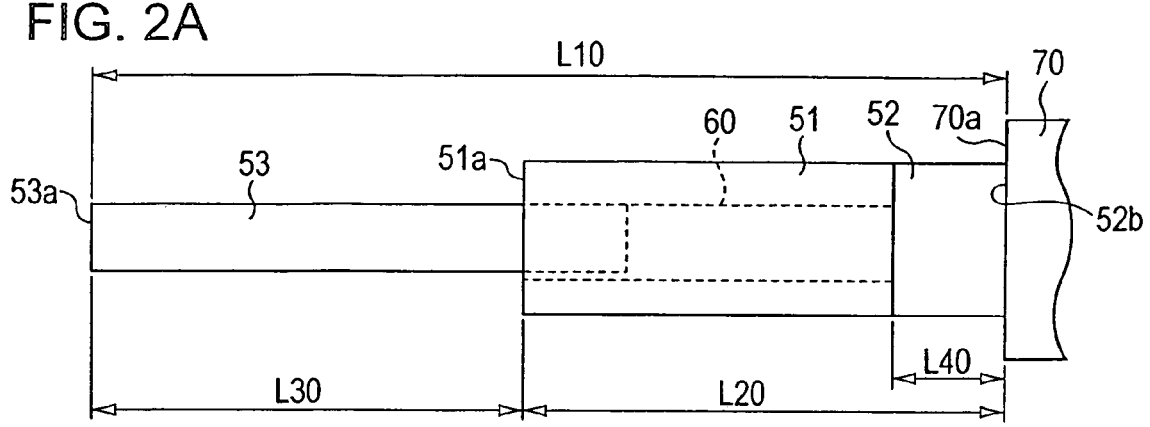
FIGS. 2A to 2C illustrate the driver 50 as viewed from the direction of arrow X1 shown in FIG. 1, and driving states of the driver 50 with the passage of time.
Figure 2B:
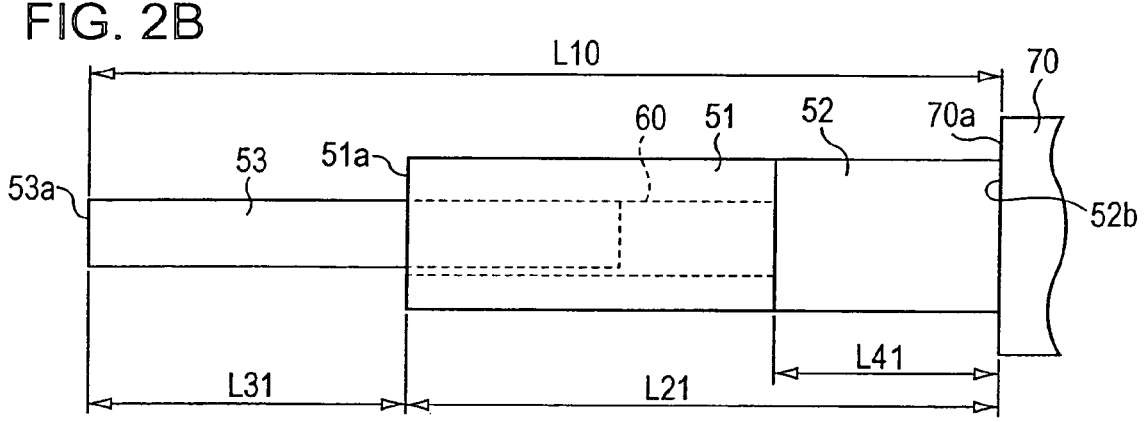
Figure 2C:
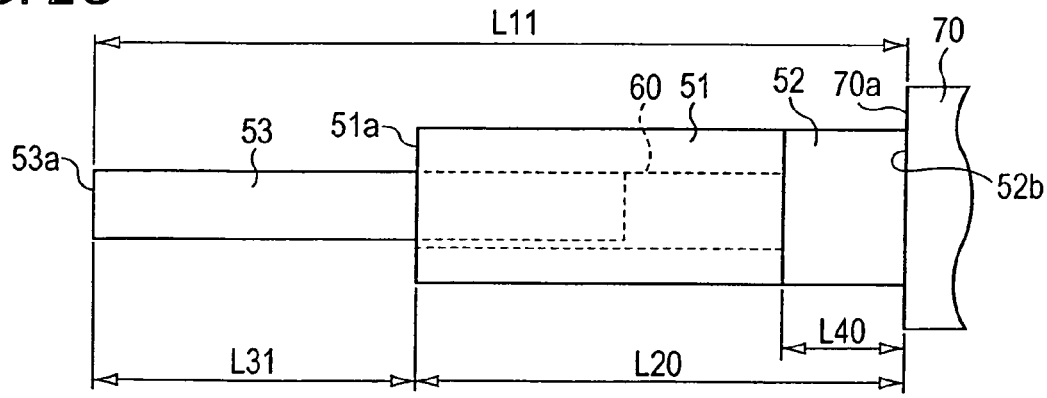
Figure 2C:
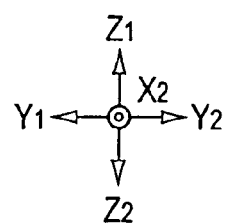
Figure 3A:
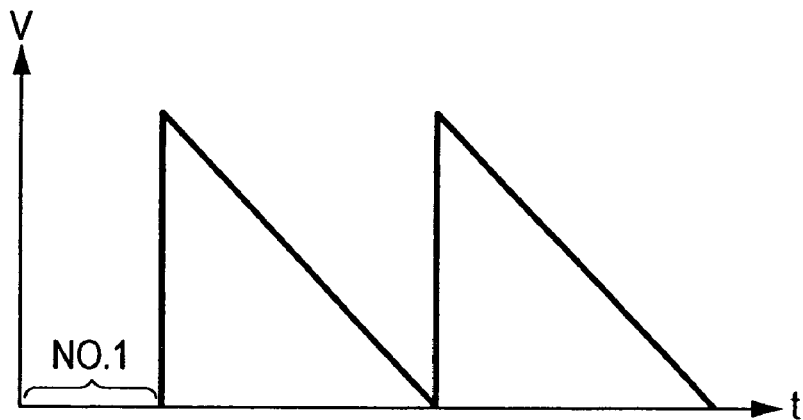
FIGS. 3A to 3C show voltage waveforms applied to the driver 50 shown in FIG. 1, and correspond to the states shown in FIGS. 2A to 2C, respectively.
Figure 3B:
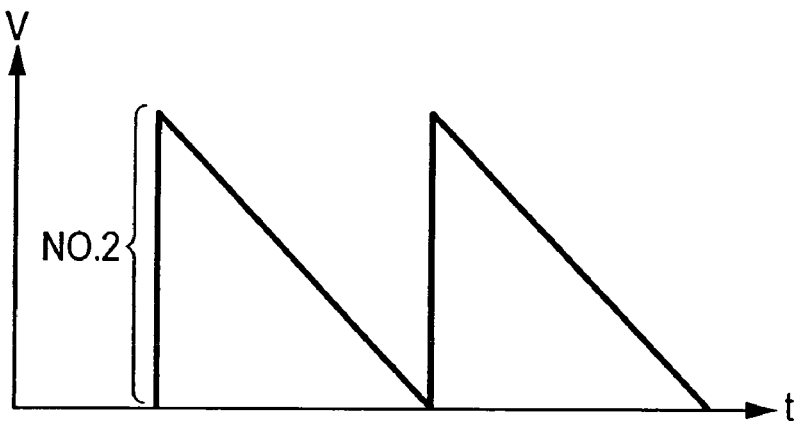
Figure 3C:
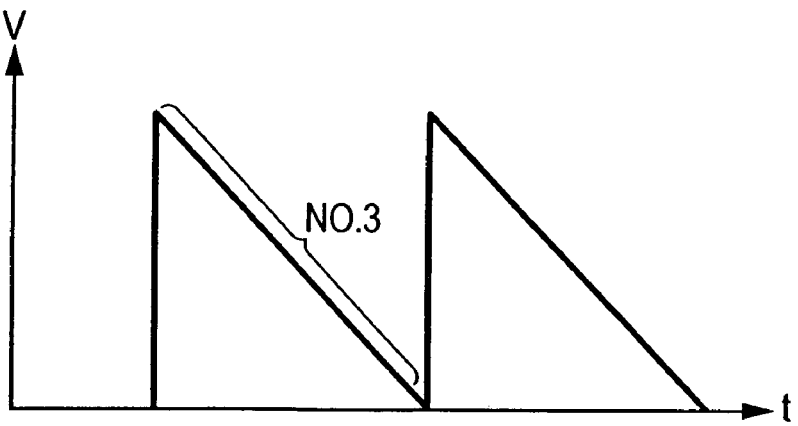

FIG. 1 is a perspective view of a driver 50 according to the present invention. FIGS. 2A to 2C illustrate the driver 50 as viewed from the direction of arrow X1 shown in FIG. 1, and driving states of the driver 50 with the passage of time. FIGS. 3A to 3C show voltage waveforms applied to the driver 50 shown in FIG. 1, and correspond to the states shown in FIGS. 2A to 2C, respectively.

As shown in FIG. 1, the driver 50 comprises a supporting member 51 formed of, for example, a ceramic material, an electromechanical energy transducer 52 joined to the supporting member 51, and a movable body 53 formed of, for example, a metallic material.

As shown in FIG. 1, the supporting member 51 is a hollow circular cylindrical member having an inner peripheral portion 60. The inner peripheral portion 60 has a diameter D1. In the embodiment shown in FIG. 1, the inner peripheral portion 60 extends continuously from a front end 51a of the supporting member 51 to a rear end 51b of the supporting member 51.

However, the inner peripheral portion 60 may extend from the front end 51a to a portion not reaching the rear end 51b. The rear end 51b is joined to a front end 52a of the electromechanical energy transducer 52.

The electromechanical energy transducer 52 has a cylindrical form having a diameter equal to the diameter of the supporting member 51. However, the electromechanical energy transducer 52 may have a diameter that differs from that of the supporting member 51, and may have a form other than a cylindrical form.

An electrical conductor (not shown) is connected to the electromechanical energy transducer 52. When a voltage is applied to and removed from the electromechanical energy transducer 52 through the electrical conductor, the electromechanical energy transducer 52 is deformed. In the embodiment shown in FIG. 1, the longitudinal length (in the illustrated Y1-Y2 dimension) of the inner peripheral portion 60 of the supporting member 51 increases and decreases. The expansion and contraction movement resulting from the deformation of the electromechanical energy transducer 52 is transmitted to the supporting member 51. For the electromechanical energy transducer 52, a piezoelectric device, an electrostrictive device, a magnetostrictive device, or the like may be used.

The movable body 53 has a cylindrical form, and has a diameter D2 that is slightly smaller than the diameter D1 of the inner peripheral portion 60. At least a portion of the movable body 53 is inserted in the inner peripheral portion 60. In the state shown in FIG. 1, a front end 53a of the movable body 53 is positioned outward from the inner peripheral portion 60, and a rear end 53b of the movable body 53 is positioned in the inner peripheral portion 60. Static frictional force is generated between the inner peripheral portion 60 and a surface 53c of the movable body 53.

The driver 50 according to the present invention is driven by making use of the deformation of the electromechanical energy transducer 52. The driving operation of the driver 50 will hereunder be described with reference to FIGS. 2 and 3. As shown in FIG. 2, in the driver 50, the rear end 52b of the electromechanical energy transducer 52 is joined and secured to a surface 70a of a securing member 70.

In the state shown in FIG. 2A, the front end 53a of the movable body 53 is separated from the surface 70a of the securing member 70 by a distance L10. Here, the distance between the surface 70a and the front end 51a of the supporting member 51 is L20. The distance between the front end 53a of the movable body 53 and the front end 51a of the supporting member 51 is L30. The longitudinal length (in the illustrated Y1-Y2 dimension) of the electromechanical energy transducer 52 is L40. In the present invention, the surface 70a of the securing member 70 serves as a reference position, and the state shown in FIG. 2A is defined as a reference state. The electromechanical energy transducer 52 in the reference state is in a prior-to-deformation state. In this reference state, as shown by No. 1 in FIG. 3A, voltage applied to the electromechanical energy transducer 52 is zero.

Next, as shown by No. 2 in FIG. 3B, when a voltage is rapidly applied to the electromechanical energy transducer 52, then, as shown in FIG. 2B, the electromechanical energy transducer 52 expands rapidly in the longitudinal direction (the illustrated Y1-Y2 dimension) of the inner peripheral portion 60 at a deformation speed that is greater than a contraction deformation speed of the electromechanical energy transducer 52 achieved during an operation (described later) in FIG. 2C, so that the longitudinal length of the electromechanical energy transducer 52 increases from L40 to L41. Here, the electromechanical energy transducer 52 is in an after-deformation state. As the electromechanical energy transducer 52 is rapidly expanded, the supporting member 51 secured to the electromechanical energy transducer 52 also moves in a direction away from the electromechanical energy transducer 52 (that is, in the illustrated direction of arrow Y1), so that the distance between the surface 70a and the front end 51a of the supporting member 51 changes from L20 to L21. However, the movable body 53 does not move, so that the front end 53a remains at rest at the position in the reference state shown in FIG. 2A. Therefore, the front end 53a of the movable body 53 is separated from the surface 70a of the securing member 70 by the distance L10. The distance between the front end 53a of the movable body 53 and the front end 51a of the supporting member 51 is reduced from L30 to L31. Since the voltage is applied rapidly, the electromechanical energy transducer 52 is also expanded rapidly. Therefore, the supporting member 51 also moves rapidly, and overcomes the static frictional force between the inner peripheral portion 60 of the supporting member 51 and the surface 53c of the movable body 53. Consequently, only the supporting member 51 moves in the direction of the front end 53a of the movable body 53.

Next, as shown by No. 3 in FIG. 3C, when the voltage being applied to the electromechanical energy transducer 52 is gradually removed, then, as shown in FIG. 2C, the electromechanical energy transducer 52 contracts in the longitudinal direction of the inner peripheral portion 60, so that the longitudinal length L41 produced after the deformation is reduced back to the length L40 produced before the deformation. As the electromechanical energy transducer 52 contracts, the supporting member 51 secured to the electromechanical energy transducer 52 also moves in the direction of the electromechanical energy transducer 52 (that is, in the illustrated direction of arrow Y2), so that the distance between the surface 70a and the front end 51a of the supporting member 51 changes from L21 to L20 that is the distance in the reference state. Here, since the applied voltage is gradually removed, the electromechanical energy transducer 52 also gradually contracts at a deformation speed that is less than the expansion deformation speed of the electromechanical energy transducer 52 achieved during the operation in FIG. 2B. Therefore, the supporting member 51 also moves gradually. Consequently, the static frictional force between the supporting member 51 and the surface 53c of the movable body 53 causes the movable body 53 as well as the supporting member 51 to move in the direction of the electromechanical energy transducer 101. Here, since static frictional force is being generated between the surface 53c of the movable body 53 and the supporting member 51, the relative positions of the movable body 53 and the supporting member 51 do not change, so that the distance between the front end 53a of the movable body 53 and the front end 51a of the supporting member 51 remains the same, that is, remains at L31 which is the distance in the state shown in FIG. 2B. In this way, since the movable body 53 as well as the supporting member 51 move in the direction of the electromechanical energy transducer 52, the distance between the front end 53a of the movable body 53 and the surface 70a is reduced from L10 to L11, so that the front end 53a of the movable body 53 is separated from the surface 70a of the securing member 70 by the distance L11.

The movable body 53 can be moved away from the electromechanical energy transducer 52 (that is, in the illustrated direction of arrow Y2) by performing the aforementioned operations in FIGS. 2A to 2C in the reverse order.

Accordingly, the amount of movement of the movable body 53 can be adjusted by repeating the operations shown in FIGS. 2A to 2C or by repeating the operations in the reverse order as a result of repeatedly applying voltage to and removing the voltage from the electromechanical energy transducer 52 shown in FIGS. 3A to 3C.

It is desirable that the difference between the diameter D1 of the inner peripheral portion 60 and the diameter D2 of the movable body 53 be within the range of from 0.5 to 1.5 µm. If the difference is equal to or less than 0.5 µm, the static frictional force between the surface 53c of the movable body 53 and the inner peripheral portion 60 becomes too large, causing the supporting member 51 as well as the movable body 53 to move when the operation shown in FIG. 2B is performed.

If the difference is greater than 1.5 µm, the static frictional force between the surface 53c of the movable body 53 and the inner peripheral portion 60 becomes too small, thereby tending to prevent the movable body 53 as well as the supporting member 51 from moving when the operation shown in FIG. 2C is performed.

In the driver 50 according to the present invention, static frictional force is generated between the inner peripheral portion 60 and the surface 53c of the movable body 53 by inserting the movable body 53 in the inner peripheral portion 60 of the supporting member 51.

The electromechanical energy transducer 52 is secured not to the movable body 53 but to the supporting member 51.

Therefore, it is not necessary to provide a part, such as a resilient presser member, in order to generate static frictional force between the inner peripheral portion 60 of the supporting member 51 and the movable body 53. Consequently, the driver can be reduced in size.

Since the electromechanical energy transducer 52 is secured to the supporting member 51, the electromechanical energy transducer 52 can be made large. Therefore, the driver 50 can generate a large drive power.

That is, the driver 50 according to the invention of the application can be made small and can generate a large drive power at the same time, so that two opposite effects can be achieved.

Since the rear end 53b of the electromechanical energy transducer 52 is secured to the surface 70a of the securing member 70, deformation movement of the electromechanical energy transducer 52 can be properly transmitted to the supporting member 51.

Although, as shown in FIG. 1, in the driver 50, the rear end 52b of the electromechanical energy transducer 52 and the front end 53a of the movable body 53 are illustrated as being placed horizontally in the illustrated directions of arrows X1 and X2, the driver 50 may be oriented in any direction in the present invention. For example, the rear end 52b of the electromechanical energy transducer 52 and the front end 53a of the movable body 53 may be placed vertically in the illustrated directions of arrows Y1 and Y2. In each of the embodiments described above, a deformation may comprise a change in shape.

In the driver 50, for example, a camera lens or a diaphragm blade may be attached to the front end 53a of the movable body 53.

What is claimed is:

1. A driver comprising;
    a supporting member having an inner peripheral portion and an outer peripheral portion;
    a movable member disposed adjacent to the inner peripheral portion of the supporting member, and in frictional contact with the supporting member, thereby allowing a front end and a rear end of the movable member to move independently of the supporting member;
    an electromechanical energy converter coupled to the outer portion of the supporting member to apply a physical pressure to the supporting member when an electrical energy is applied to the electromechanical energy converter, wherein successive applications of the physical pressure, in a first operation, cause the front end of the movable member to be drawn further and further into the supporting member.

2. The driver according to claim 1, wherein the supporting member comprises a distal portion and a proximal portion, and wherein the electromechanical energy converter is coupled to the proximal portion of the supporting member.

3. The driver according to claim 2, wherein a portion of the movable member is disposed adjacent to the distal portion of the inner peripheral portion of the supporting member.

4. The driver according to claim 1, wherein the front end of the movable body is disposed outward from the inner peripheral portion.

5. The driver according to claim 1, wherein the electromechanical energy converter comprises a front end and a rear end in alignment with a movement of the electromechanical energy converter, and
    wherein a securing member is coupled to the rear end of the electromechanical energy converter.

6. The driver according to claim 1, wherein a central axis of the movable member is aligned with a central axis of the inner peripheral portion of the supporting member.

7. The driver according to claim 1, wherein both the inner peripheral portion of the supporting member and the movable member have cylindrical shapes.

8. The driver according to claim 7, wherein a diameter of the movable member is smaller than that of the inner peripheral portion of the supporting member.

9. The driver according to claim 1, wherein the electromechanical energy converter comprises a piezoelectric device.

10. The driver according to claim 1, wherein a lens is disposed near a front end of the movable member.

11. The driver according to claim 1, wherein a diaphragm blade is disposed near a front end of the movable member.

12. A driver comprising;
    a supporting member having an inner peripheral portion and an outer peripheral portion;
    a movable member disposed adjacent to the inner peripheral portion of the supporting member, and in frictional contact with the supporting member, thereby allowing a front end and a rear end of the movable member to move independently of the supporting member;
    an electromechanical energy converter coupled to the outer portion of the supporting member to apply a physical pressure to the supporting member when an electrical signal is applied to the electromechanical energy converter; and
    wherein a static frictional force retains the movable member and the inner peripheral portion of the supporting member, and
    wherein the supporting member moves in an axial direction as the physical pressure applied to the supporting member exceeds the static frictional force, and wherein successive applications of the physical pressure, in a first operation, cause the front end of the movable member to be drawn further and further into the supporting member.

13. The driver according to claim 12, wherein the electrical signal corresponds to a voltage applied to the electromechanical energy converter that rapidly changes at a first time and gradually changes at a second time, wherein a rapid change in voltage induces a corresponding rapid change in axial position of the supporting member that causes a momentary break in contact between the movable member and the supporting member, and wherein a gradual change in voltage induces a corresponding gradual change in axial position of the supporting member that is insufficient to break contact between the moving member and the supporting member.

14. The driver according to claim 12, wherein a lens is disposed at a front end of the movable member.

15. The driver according to claim 12, wherein a diaphragm blade is disposed at a front end of the movable member.

16. A method of moving a driver comprising:
    providing a supporting member having an inner peripheral portion and an outer peripheral portion, a movable member disposed adjacent to the inner peripheral portion of and in frictional contact with the supporting member, allowing a front end and a rear end of the movable member to move independently of the supporting member, and an electromechanical energy converter coupled to the outer portion of the supporting member to apply a physical pressure to the supporting member when an electrical signal is applied to the electromechanical energy converter; and
    moving the supporting member in an axial direction, as the physical pressure applied to the supporting member exceeds a static frictional force, wherein successive applications of the physical pressure, in a first operation, cause the front end of the movable member to be drawn further and further into the supporting member.

17. The method of moving the driver according to claim 16, further comprising, rapidly applying a voltage to the electromechanical energy converter;
    moving the supporting member in an axial direction of an expansion or a contraction of the electromechanical energy converter.

18. The method of driving the driver according to claim 16, wherein a camera lens is disposed at a front end of the movable member.

19. The method of driving the driver according to claim 16, wherein a diaphragm blade is disposed at a front end of the movable member.

* * * * *